July 16, 1940.  F. O. HOAGLAND  2,207,805
INDEXING MECHANISM FOR RIFLING MACHINES
Filed Nov. 16, 1938  2 Sheets-Sheet 1
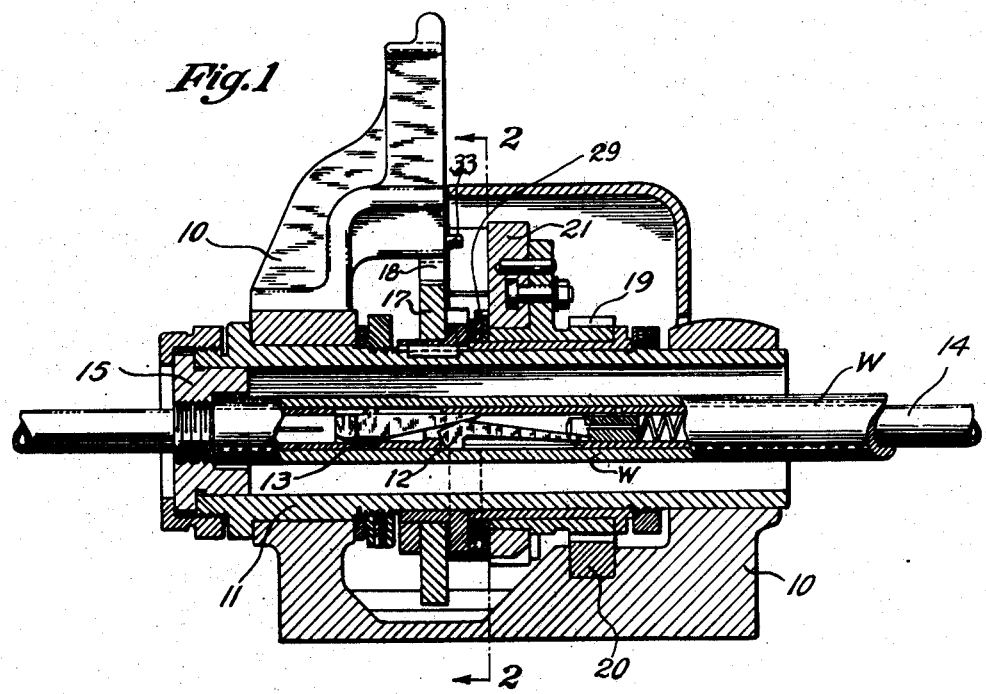
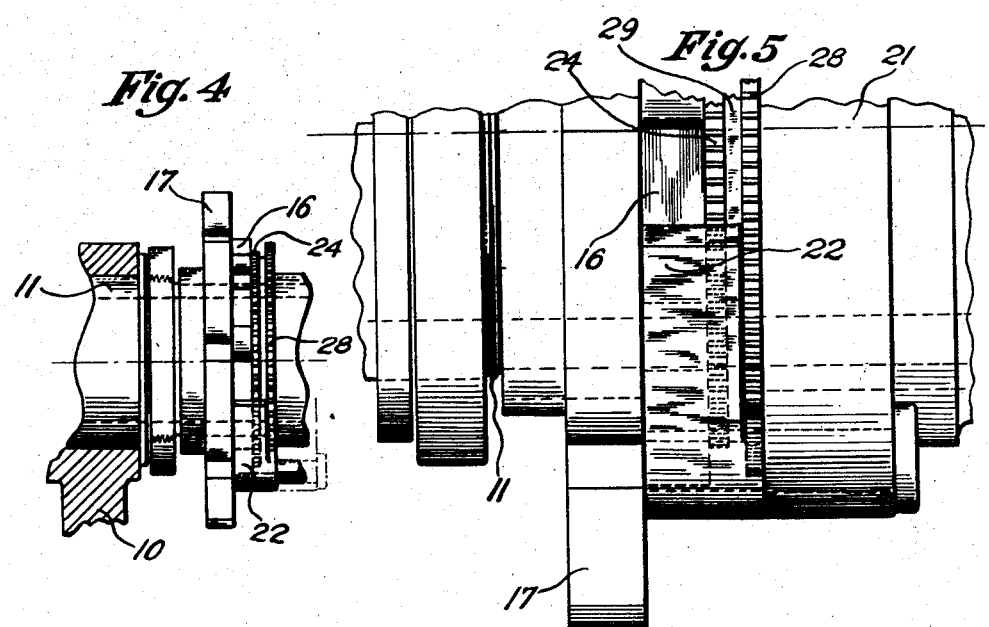
INVENTOR.
F. O. Hoagland
BY Joseph K. Schofield
ATTORNEY July 16, 1940.                F. O. HOAGLAND                 2,207,805
                INDEXING MECHANISM FOR RIFLING MACHINES
                Filed Nov. 16, 1938              2 Sheets-Sheet 2
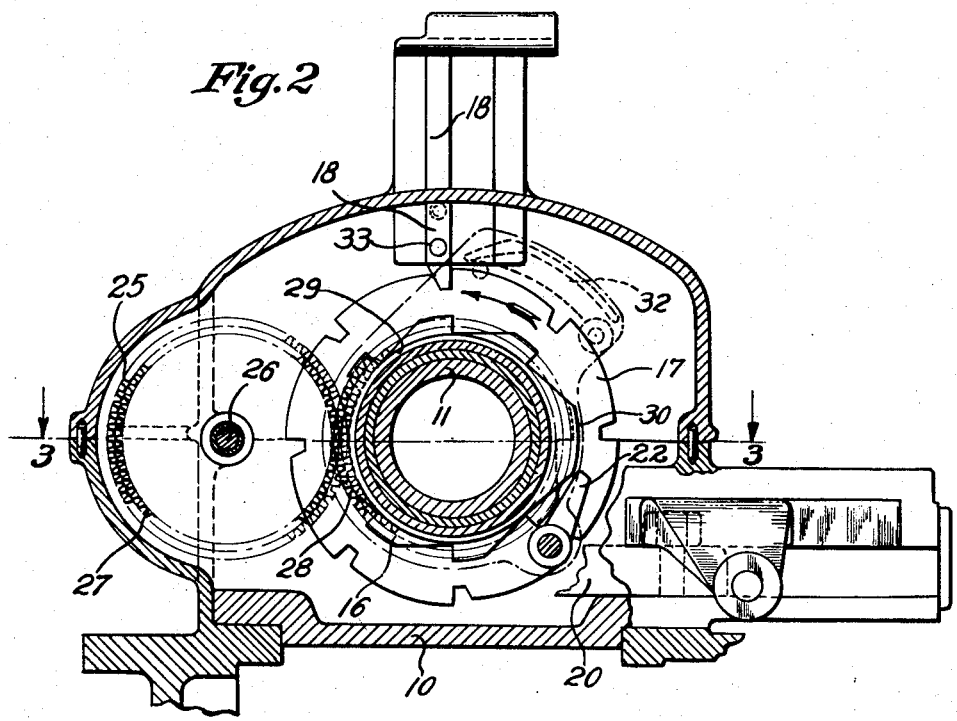
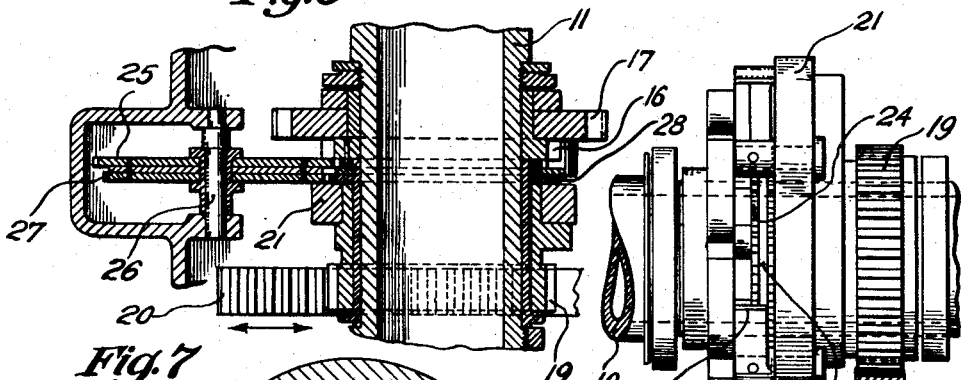
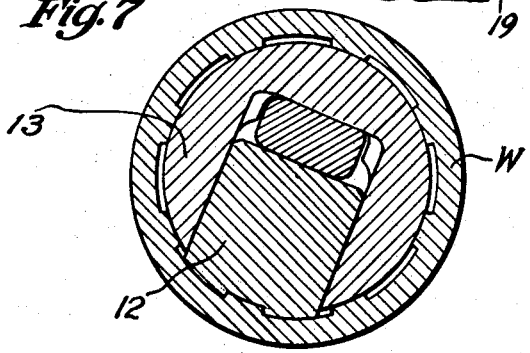
INVENTOR.
F. O. Hoagland
BY Joseph K. Schofield
ATTORNEY

Patented July 16, 1940

2,207,805

UNITED STATES PATENT OFFICE

2,207,805

INDEXING MECHANISM FOR RIFLING MACHINES

Frank O. Hoagland, West Hartford, Conn., assignor to Niles-Bement-Pond Company, Hartford, Conn., a corporation of New Jersey Application November 16, 1938, Serial No. 240,631

6 Claims. (Cl. 90—57)

This invention relates to an indexing mechanism primarily adapted for gun barrel rifling machines and particularly to an indexing mechanism in which the rifling tool is adapted to cut more than one groove in the member being rifled during a single passage of the tool through the member being rifled.

A primary object of the indexing mechanism forming the present invention is to successively index the work relative to the cutting tool through an angle subtended by a plurality of flutes in the work for a predetermined number of times and then to index the work a single space, and thereafter again index the work through a plurality of spaces for the same predetermined number of times, the single or one space indexing and the successive multiple indexing movements following each other alternately until the member is completely formed.

It has heretofore been the practice to rifle the barrel of a shoulder musket, or larger calibre gun, by employing a single cutting tool acting upon and cutting the entire width of one only of the grooves. Between each successive stroke of the cutting tool through the work, the work was indexed relative to the tool through the angular space of one groove. In the present invention provision is made for the employment of a multiple rifling or cutting tool engaging the major portions of two adjacent grooves or flutes in the rifled member and the mechanism forming the present invention is designed to index the member being rifled relative to the tool through the angular space of two of the grooves.

If the member being rifled has an odd number of grooves, the multiple indexing will enable the tool to completely finish the rifled member, as at each rotation of the work relative to the cutting tool the tool will be positioned to finish different grooves. With rifled members having an even number of lands and grooves, however, it will be seen that a multiple tool with double indexing will bring the tool into exactly the same position each complete revolution. As the tool cannot be made to completely form two adjacent grooves in the preferred or standard form of rifling grooves, means must be employed to index the member relative to the tool at the end of each rotation a single space instead of a double space.

It is therefore a primary object of the present invention to provide an indexing mechanism which will index a member being rifled such as a gun barrel through an angle equal to a double or multiple index movement for one revolution and then will index the member through a single index movement. Then after this one single indexing movement of the member the double indexing will be resumed until another complete revolution of the work relative to the tool has taken place. Thereupon a second single indexing movement will be employed.

In the rifling of a standard rifle having eight lands and grooves, the cutter will be successively indexed four times, each indexing being through the angular space of two adjacent grooves. After the fourth double indexing movement the next index movement will be a single indexing movement after which the double indexing will be repeated until a second complete rotation of the work is effected. This cycle is repeated until the tool has been fed into the barrel to fully finish the grooves. It will be understood that with each complete rotation of the work the cutter will be fed slightly radially to engage the work piece at successively increasing depths so that after a plurality of complete rotations the rifling member will have its grooves cut to their full depth.

With the above and other objects in view, my invention consists in the features of construction and operation set forth in the following specification and illustrated in the accompanying drawings.

In the accompanying drawings annexed hereto and forming a part of this specification, I have shown my invention embodied in a rifling machine for a standard .50 calibre rifle, but it will be understood that the invention can be otherwise embodied and that the drawings are not to be construed as defining or limiting the scope of the invention, the claims appended to this specification being relied upon for that purpose.

In the drawings:

Figure 1 is a longitudinal view in section of an indexing mechanism made in accordance with the present invention, the section being taken on the axis of rotation of the mechanism and work being rifled.

Fig. 2 is a transverse sectional view of the mechanism shown in Fig. 1, the section being taken on the plane of line 2—2 in Fig. 1.

Fig. 3 is a horizontal sectional view of the indexing mechanism, the section being taken upon the plane 3—3 in Fig. 2.

Fig. 4 is a fragmentary longitudinal view showing an outside view of the indexing plate and parts adjacent thereto.

Fig. 5 is a view similar to Fig. 4 and showing a part thereof upon an enlarged scale.

Fig. 6 is a front elevation showing an outside view of the index plate, the actuator for the indexing pawl and parts adjacent thereto; and Fig. 7 is a transverse sectional view of a rifling tool used with the present invention shown upon an enlarged scale, the tool being shown in operative position within a gun barrel.

In the above mentioned drawings, I have shown but one embodiment of the invention which is now deemed preferable, but it is to be understood that changes and modifications may be made within the scope of the appended claims without departing from the spirit of the invention.

Briefly and in its broadest aspect, the invention may include the following principal parts: First, a rotatably mounted member or sleeve within which the work piece, such as a gun barrel being rifled, may be mounted centrally thereof; second, an index plate secured to said rotatable member; third, a plunger movable into and out of locking engagement therewith; fourth, a ratchet wheel fixed to said rotatable member; fifth, a pawl movable back and forth relative to said ratchet wheel to successively advance said rotatable member angularly about its axis; sixth, an actuator for said plunger and pawl; seventh, a shield to render said pawl inoperative to advance said ratchet wheel and rotatable member; and eighth, angular advancing means for said shield to periodically move the shield into position to render a portion of one indexing movement of said pawl inoperative after a predetermined number of full operative movements.

Referring more in detail to the figures of the drawings, there is shown an index head 10 for a gun barrel rifling machine having a member or sleeve 11 rotatably mounted therein to which the gun barrel or other member W being rifled may be mounted. The rifling tool 12 is mounted within a head 13 (not shown) and is passed longitudinally back and forth through the entire length of the member being rifled by means of a rod 14 on which the head 13 is mounted. The rotatable member 11 at one end may have an adapter 15 thereon by means of which the member W being rifled may be secured thereto coaxially with the rotatable member 11. As shown, this member 15 preferably engages a threaded portion of the rifle barrel W at one end.

Keyed directly to this rotatable member 11 is a ratchet wheel 16 having as many notches as there are to be grooves in the rifled member. Also keyed or otherwise secured to this ratchet member 16 is a notched index plate 17 adapted to be engaged by a radially movable plunger 18 to rigidly hold the rotatable member 11 in each indexed position during the passage therethrough of the indexing tool 12. Means to withdraw the plunger 18 at the proper time to permit indexing and also to permit it to enter a recess in the plate 17 to rigidly retain the member 11 during the cutting operation will presently be more fully described.

Rotatably mounted upon the rotatable member 11 is a gear 19 the teeth of which mesh with teeth on a transversely disposed rack 20 actuated by any preferred means. Reciprocatory movements of the rack 20 oscillate the gear 19 through a definite angle for each indexing operation and are of sufficient amplitude for the rotatable member 11 to be double indexed, that is, advanced angularly the distance of two index spaces on the index plate 17. As the means for actuating this rack 20 form no part of the present invention, further description thereof is not thought to be necessary. It will be sufficient to state that the gear 19 is oscillated through a sufficient angle to advance an indexing pawl 22 angularly the distance of two spaces on the notched plate 17.

Mounted on this gear is an oscillating member 21 which forms an actuator for the pawl 22 pivoted at one end thereon and having its free end so formed that it may engage successive notches in the ratchet plate or gear 16 mounted on the rotatable member. From the above it will be seen that each movement of the rack 20 and corresponding oscillatory movement of the member 21 carrying the gear 19 will cause the pawl 22 to successively engage alternate notches of the ratchet plate 16 and angularly advance this plate 16 and the rotatable member 11 therewith so that the plunger 18 will engage alternate notches formed in the index plate 17.

Keyed or pinned to and rotatable with the ratchet wheel 16 is a narrow faced gear 24 mounted coaxially therewith which engages an idler gear 25 mounted upon a laterally positioned shaft 26 as shown in Fig. 3. This idler gear 25 has secured to it an adjacent coaxially mounted gear 27 spaced slightly therefrom. This second gear 27 meshes with a gear 28 concentric with the rotatable member 11 and freely rotatable thereon. This latter gear 28 is secured directly to a thin cam member 29 rotatable therewith having a single lobe 30 substantially as shown in Fig. 2. The cam 29 may, as shown, be disposed between the gears 24 and 28 on the rotatable member 11 and its lobe extends diametrically slightly beyond the teeth of the ratchet member 16.

It will be seen from the above described mechanism and with the gears as above described, that the cam 29 will be rotated through a less angular distance than the ratchet wheel 16 with each oscillatory movement of the pawl 22, the ratio between the angular movement of the ratchet wheel 16 and that of the cam 29 being such that after a predetermined number of indexing movements of the pawl, the cam will lag behind the index plate 16 the angular distance of one indexing space. Each time the cam 29 is rotated to the position shown in Fig. 2, the pawl 22 rests upon its periphery at the lobe portion 30 and prevents the pawl 22 from engaging one of the teeth of the ratchet wheel 16 during the first half of its movement. As soon as the pawl 22 runs off the end of the lobe 30 of the cam 29, the pawl 22 engages one of the teeth of the ratchet wheel 16 one notch ahead of that which it otherwise would engage and advances the ratchet wheel and the rotatable member an angular distance equal to that between adjacent teeth only.

Each oscillatory movement of the pawl 22 will, providing the lobe 30 of the cam 29 does not prevent it from so doing, advance, in the example shown in the drawings, the ratchet wheel 16 and the rotatable member 11 through an angular space of two index spaces. When the lobe 30 of the cam 29 is in the position shown in Fig. 2, however, the pawl 22 will ride over the first notch in its path and will not rotate the ratchet wheel 16 through the two spaces as usual, but this angular movement will be reduced one-half so that the ratchet wheel 16 is angularly advanced but a single space.

With each indexing movement of the ratchet wheel 16 the lobe 30 of the cam will be rotated through a less angle than the index plate 16 due to its gearing connections so that it completes one index space less than one rotation while four indexing movements of the rotatable member take place. During these four indexing movements when the lobe 30 of the cam 29 does not interfere with the functioning of the ratchet, the ratchet 16 gives a double indexing movement to the ratchet wheel 16 and after the fourth indexing movement occurs the cam 29 is again in the position shown in Fig. 2 so that the fifth indexing movement will be reduced to one-half the angular advance. After each complete rotation of the rotatable member 11 which has eight notches, the rotatable member 11 is advanced one notch only. The rotatable member 11 is then indexed successively through the space of two notches until the cam 29 again rotates for its lobe 30 to render inoperative the first half of the movement of the pawl by acting as a shield over a part of the ratchet plate 16.

From the above it will be seen that the member W being rifled is first indexed double the space between successive rifling grooves for one complete revolution, that is, four indexings in the example selected for illustration. The member W is then indexed a single space. The member W then is successively indexed again through double spaces for another complete revolution. The cycle of four double space indexes, one single space index and then the repeating of the four double space indexes continues until the grooves are cut to their proper depth.

To disengage the locking bolt or plunger 18 from the notched plate 17 a second pawl 32 is employed, the forward end of which is beveled as shown and engages a laterally extending pin 33 outstanding from a surface of the plunger 18 so that as soon as the actuating member 21 starts to move in one direction and before the pawl 22 engages a tooth of the ratchet wheel 16, the detent or plunger 18 is withdrawn from its notch and is retained in an outer inoperative position until the indexing movement is complete. As soon as this movement is complete the pin 33 outstanding from the plunger 18 rides off the rear end of the pawl 32, which permits the plunger 18 to drop or be spring pressed into another of the notches in plate 17. As the action of the locking plunger forms no part of the present invention, further description of its construction and operation are not thought necessary.

What I claim is:

1. An indexing mechanism for metal cutting machines comprising in combination, a rotatable member on which the member to be indexed may be mounted, a ratchet wheel secured to said rotatable member, a pawl engaging said ratchet wheel, an actuator carrying said pawl and movble to cause said pawl to angularly advance said ratchet member, and means operated by said actuator to periodically render said pawl inoperative during a portion of its movement to advance said member.

2. An indexing mechanism for metal cutting machines comprising in combination, a rotatable member on which the member to be indexed may be mounted, a ratchet wheel secured to said rotatable member, a pawl engaging said ratchet wheel, an actuator carrying said pawl and movable to cause said pawl to angularly advance said ratchet member, and means operated by said actuator to periodically render said pawl inoperative to advance said member during the first part of its indexing movement.

3. An indexing mechanism for metal cutting machines comprising in combination, a rotatable member on which the member to be indexed may be mounted, a ratchet wheel secured to said rotatable member, a pawl engaging said ratchet wheel, an actuator carrying said pawl and movable to cause said pawl to advance said ratchet member a predetermined angular distance, and means operated by said actuator to render said pawl inoperative to advance said member during a portion of its indexing movement after a plurality of fully operative movements thereof.

4. An indexing mechanism for metal cutting machines comprising in combination, a rotatable member on which the member to be indexed may be mounted, a ratchet wheel secured to said rotatable member, a pawl engaging said ratchet wheel, an actuator carrying said pawl and movable to cause said pawl to advance said ratchet member an angular distance equal to two index spaces, and means operated by said actuator to render said pawl inoperative to advance said member during a portion of its indexing movement equal to one index space after a plurality of two index space movements of said pawl.

5. An indexing mechanism for rifling machines comprising in combination, a rotatably mounted member within which the work piece being rifled may be mounted for rotation therewith, a notched plate secured thereon, a ratchet wheel secured to said member adjacent said notched plate, a pawl engaging said ratchet wheel and oscillated to successively advance said member, a cam rotatable adjacent said ratchet wheel, and means to angularly advance said cam with each oscillating movement of said ratchet wheel, whereby when said pawl is engaged by said cam movement of said member by said pawl is prevented for a portion of its movement.

6. An indexing mechanism for rifling machines comprising in combination, a rotatably mounted member within which the work piece being rifled may be mounted for rotation therewith, a notched plate secured thereon, a ratchet wheel secured to said member adjacent said notched plate, a pawl engaging said ratchet wheel and oscillated to rotate said member, a cam rotatable adjacent said ratchet wheel, means to angularly advance said cam with each oscillating movement of said ratchet wheel but a less distance than said wheel, and a lobe on said cam engaging said pawl and restricting operative movement of said pawl for a portion of its movement when said cam is in one rotative position.

FRANK O. HOAGLAND.